US012634306B2

(12) United States Patent
Meller et al.

(10) Patent No.: US 12,634,306 B2
(45) Date of Patent: May 19, 2026

(54) ZERO TRUST ARCHITECTURE WITH BROWSER-SUPPORTED SECURITY POSTURE DATA COLLECTION

(71) Applicant: Kolide, Inc., Malden, MA (US)

(72) Inventors: Jason Meller, Winchester, MA (US); Joseph Sokol-Margolis, Cambridge, MA (US); Levi C. Kennedy, Nashville, TN (US)

(73) Assignee: AgileBits Inc., Toronto (CA)

( * ) Notice: Subject to any disclaimer, the term of this patent is extended or adjusted under 35 U.S.C. 154(b) by 7 days.

(21) Appl. No.: 18/609,582

(22) Filed: Mar. 19, 2024

(65) Prior Publication Data

US 2024/0430275 A1      Dec. 26, 2024

Related U.S. Application Data

(63) Continuation of application No. 18/214,326, filed on Jun. 26, 2023, now Pat. No. 11,936,671.

(51) Int. Cl.
| | |
|---|---|
| *H04L 29/06* | (2006.01) |
| *G06F 21/30* | (2013.01) |
| *G06F 21/31* | (2013.01) |
| *H04L 9/32* | (2006.01) |
| *H04L 9/40* | (2022.01) |

(52) U.S. Cl.
CPC .......... *H04L 63/1416* (2013.01); *G06F 21/30* (2013.01); *G06F 21/31* (2013.01); *H04L 9/3271* (2013.01)

(58) Field of Classification Search
CPC ... H04L 63/1416; H04L 9/3271; H04L 63/08; H04L 63/0815; G06F 21/30; G06F 21/31
See application file for complete search history.

(56) References Cited

U.S. PATENT DOCUMENTS

| | | | | |
|---|---|---|---|---|
| 9,436,820 B1 * | 9/2016 | Gleichauf | ............... | H04L 63/02 |
| 9,639,825 B1 * | 5/2017 | Roth | ..................... | H04L 9/3271 |
| 2013/0179692 A1 * | 7/2013 | Tolba | .................. | H04L 63/0861 |
| | | | | 713/179 |
| 2015/0326594 A1 * | 11/2015 | Chari | .................. | H04L 63/1466 |
| | | | | 726/22 |
| 2021/0044623 A1 * | 2/2021 | Bosch | ................... | G06F 21/575 |
| 2021/0297422 A1 * | 9/2021 | McDorman | ........... | H04L 63/107 |

OTHER PUBLICATIONS

Tamvada, Jagannatha Haritash. "Posture of an End Point." Seminar on Network Security. 2007. (Year: 2007).*

* cited by examiner

*Primary Examiner* — Ka Shan Choy
(74) *Attorney, Agent, or Firm* — David H. Judson

(57) ABSTRACT

A zero trust application enables access to a protected resource from a client device associated with a user. The client device has a browser, and an agent running locally and accessible via a local loopback interface. During an authentication flow, a browser-based script executes in the browser to deliver a challenge to the agent, and to collect a response to that challenge from the agent using a graphics file-based encoding scheme, and to deliver that information to the application for verifying the client device and its security posture. Depending on that security posture, the authentication flow may be permitted to complete. If a failure of the security posture is identified, the user may be permitted during the on-going authentication flow to address that failure and request a re-check of the posture.

9 Claims, 7 Drawing Sheets

Figure 1:
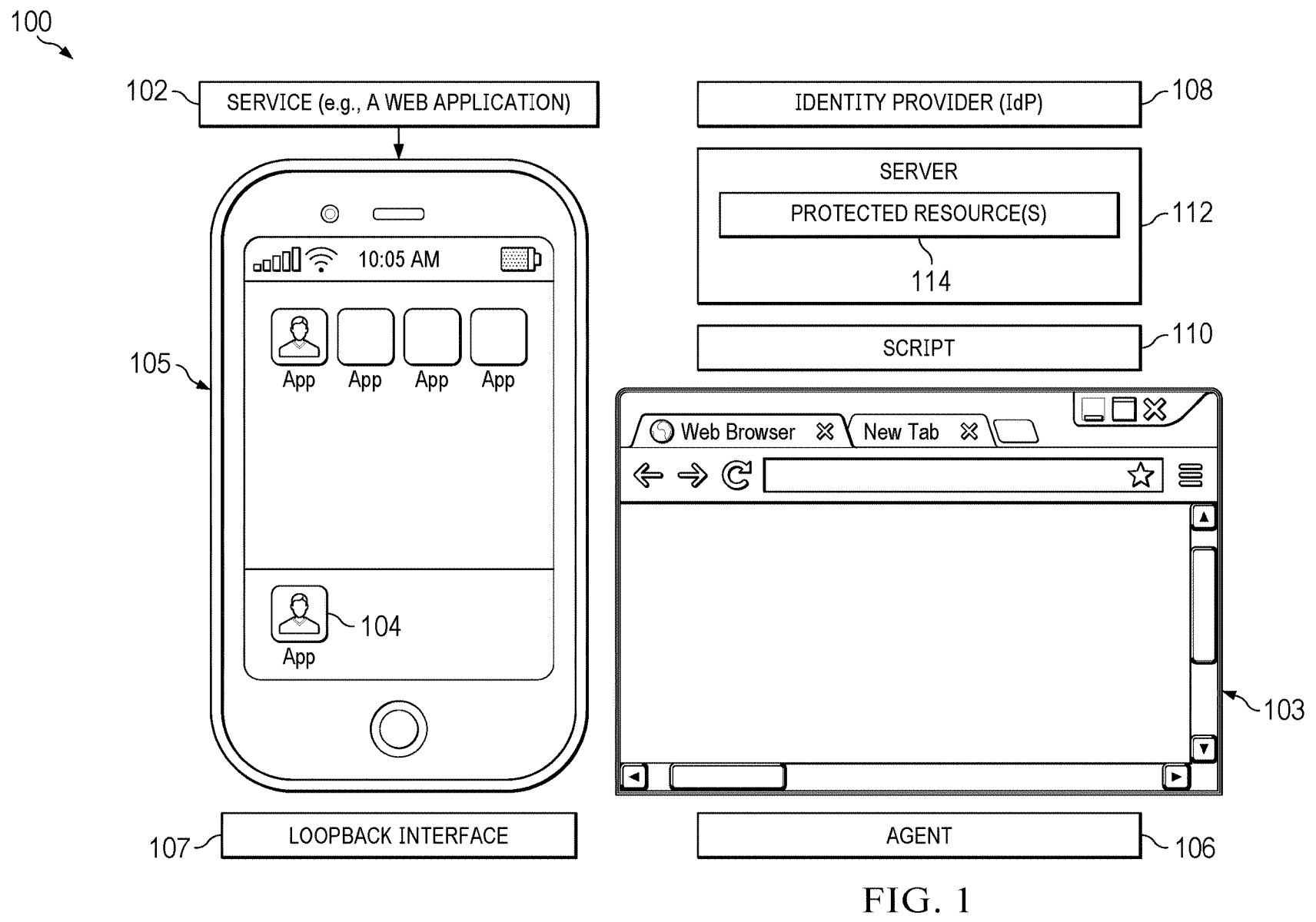

100

IDENTITY PROVIDER (IdP) 108

SERVER 112

PROTECTED RESOURCE(S) 114

SCRIPT 110

103

Web Browser New Tab

App App App App

App

104

105

SERVICE (e.g., A WEB APPLICATION) 102

AGENT 106

LOOPBACK INTERFACE 107

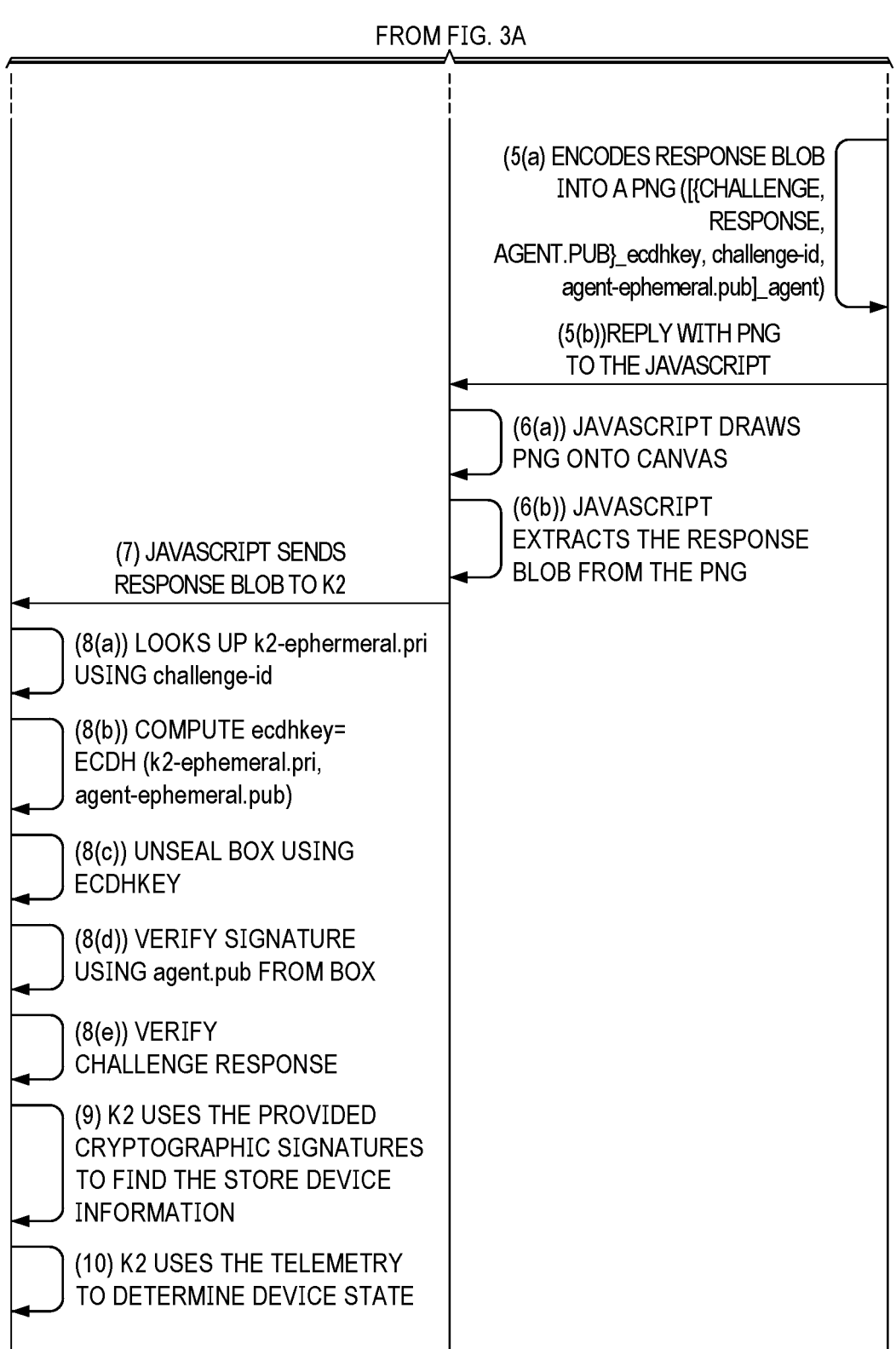

FROM FIG. 3A (5(a) ENCODES RESPONSE BLOB INTO A PNG ([{CHALLENGE, RESPONSE, AGENT.PUB}_ecdhkey, challenge-id, agent-ephemeral.pub]_agent)

(5(b))REPLY WITH PNG TO THE JAVASCRIPT (6(a)) JAVASCRIPT DRAWS PNG ONTO CANVAS (6(b)) JAVASCRIPT EXTRACTS THE RESPONSE BLOB FROM THE PNG (7) JAVASCRIPT SENDS RESPONSE BLOB TO K2

(8(a)) LOOKS UP k2-ephermeral.pri USING challenge-id (8(b)) COMPUTE ecdhkey= ECDH (k2-ephemeral.pri, agent-ephemeral.pub)

(8(c)) UNSEAL BOX USING ECDHKEY (8(d)) VERIFY SIGNATURE USING agent.pub FROM BOX (8(e)) VERIFY CHALLENGE RESPONSE (9) K2 USES THE PROVIDED CRYPTOGRAPHIC SIGNATURES TO FIND THE STORE DEVICE INFORMATION

(10) K2 USES THE TELEMETRY TO DETERMINE DEVICE STATE

DEVICE BLOCKED

YOU MUST RESOLVE THE ISSUES LISTED
BELOW BEFORE YOU CAN FINISH SIGNING IN

NAME_MacBook-PRO

JEN8675309

RECHECK  ⌐506

ⓧ DEVICE HAS NOT BEEN REBOOTED RECENTLY          DETAILS ⌐502

ⓧ AUTOMATIC UPDATES IMPROPERLY CONFIGURED          DETAILS

FIX THE BLOCKING ISSUES TO SIGN IN          ⌐504

HAVING ISSUES? CONTACT SUPPORT

WILL BLOCK YOUR DEVICE SOON

⚠ UNENCRYPTED SSH KEY DETECTED          TOMORROW

508

ZERO TRUST ARCHITECTURE WITH BROWSER-SUPPORTED SECURITY POSTURE DATA COLLECTION

BACKGROUND OF THE INVENTION

This disclosure relates generally to zero trust-based technologies, products and services.

Conventional network security has focused on network perimeter defenses (such as intrusion detection), but many organizations no longer have a clearly-defined network perimeter. Remote work environments and the extensive use of mobile computing devices have dissolved traditional network boundaries. To protect a modern digital enterprise, organizations need a comprehensive strategy for secure "anytime, anywhere" access to their corporate resources (e.g., applications, legacy systems, data, and devices) regardless of where they are located or how they are configured. To address this need, the zero trust security model, also known as zero trust architecture (ZTA) or perimeter-less security, has been developed. Zero trust describes an approach to the strategy, design and implementation of Information Technology (IT) systems. In this approach, users and devices are not trusted by default, even if they are connected to a permissioned network, and even if they were previously verified. ZTA is implemented by establishing strong identity verification, validating device compliance prior to granting access, and ensuring least privilege access to only explicitly authorized resources.

While a zero trust solution theoretically can be used to block a device from accessing an enterprise's Software-as-a-Service (Saas)-based applications and other resources, existing security technologies that are leveraged in a ZTA can themselves be targeted for attack. For example, Single sign-on (SSO) is commonly utilized to allow a user to log in with a single ID to any of several related, yet independent, software systems. Adding multi-factor authentication (MFA) as an additional login security layer significantly reduces risk, but today's MFA solutions have significant security flaws. In particular, many existing token or push-based possession-based factors can be easily phished by an attacker who can social engineer the user to supply the secret code or approve an authentication attempt.

SUMMARY OF THE INVENTION

The device trust architecture herein is zero trust-based and preferably is implemented as a SaaS solution. The solution is designed to prevent malicious actors who do not have access to a device that the solution currently trusts from accessing any applications or other resources that are protected by the service. The architecture establishes a reliable communication channel between the device and the service during web and SaaS authentication, and preferably the device trust here is established as a phishing-resistant possession-based factor within an existing multi-factor authentication flow.

According to one aspect, a cloud-based ZTA application enables access to a protected resource from a client device associated with a user. The client device has a browser, and an agent running locally and accessible via a local loopback interface on the client device. The method is carried out by the cloud-based application during an authentication flow to the protected application that is initiated by the client. In particular, as the authentication flow is initiated, the cloud-based application provides the browser a script. The script is executed automatically by the browser and provides several functions: (i) to request and receive from the cloud-based application a cryptographic challenge, (ii) to deliver the challenge to the local agent via the local loopback interface, (iii) to receive from the agent an image (in the form of a graphics file) that encodes given information, and (iv) to transform the given information in the image into a blob that is then output to the cloud-based application The given information comprises the challenge, the response to the challenge, one or more device identifiers, and a client device attestation. In response to receiving the blob, the cloud-based application decrypts the blob and recovers the challenge, the response to the challenge, the device identifiers, and the client device attestation. The recovered information is then used to confirm that the client device is recognized by the service (e.g., by virtue of a prior registration of the device agent) and associated with the user seeking to authenticate. If the device is recognized, the service authorizes the authentication flow to complete. The service also determines a security posture of the identified client device. Typically, the security posture is identified from device telemetry collected by the agent, and this telemetry may be collected out-of-band with respect to the authentication flow. Advantageously, the browser is enabled to be used as a communication conduit (between the agent and the cloud-based application) during this process by leveraging the image to encode relevant response information.

According to a further aspect of this disclosure, and during the authentication flow to the protected application, the cloud-based application determines whether a security posture of the client device satisfies one or more security compliance requirements associated with a permitted access to the resource. Upon determining that the client device does not satisfy a given security compliance requirement, the system provides a notification to the user indicating a failure associated with the given security compliance requirement. That notification may include information about how to rectify the failure. Advantageously, and as the authentication flow to the protected application proceeds, the notification also provides a mechanism by which the user can request a re-check of the security posture of the client device after he or she has rectified the identified failure. Depending on the severity of the failure, completion of the authentication flow may be blocked until receipt of the re-check request from the user and verification that the security posture of the client device against the given security compliance requirement is satisfied.

The foregoing has outlined some of the more pertinent features of the subject disclosure. These features should be construed to be merely illustrative. Many other beneficial results can be attained by applying the disclosed subject matter in a different manner or by modifying the subject matter as will be described.

BRIEF DESCRIPTION OF DRAWINGS

For a more complete understanding of the present invention and the advantages thereof, reference is now made to the following descriptions taken in conjunction with the accompanying drawings, in which:

FIG. 1 depicts a zero trust architecture (ZTA) according to this disclosure;

FIGS. 3A-3B depict a UML interaction diagram depicting a device sign-in flow between a client and the ZTA service according to an embodiment of this disclosure;

DETAILED DESCRIPTION OF THE INVENTION

Figure 2:
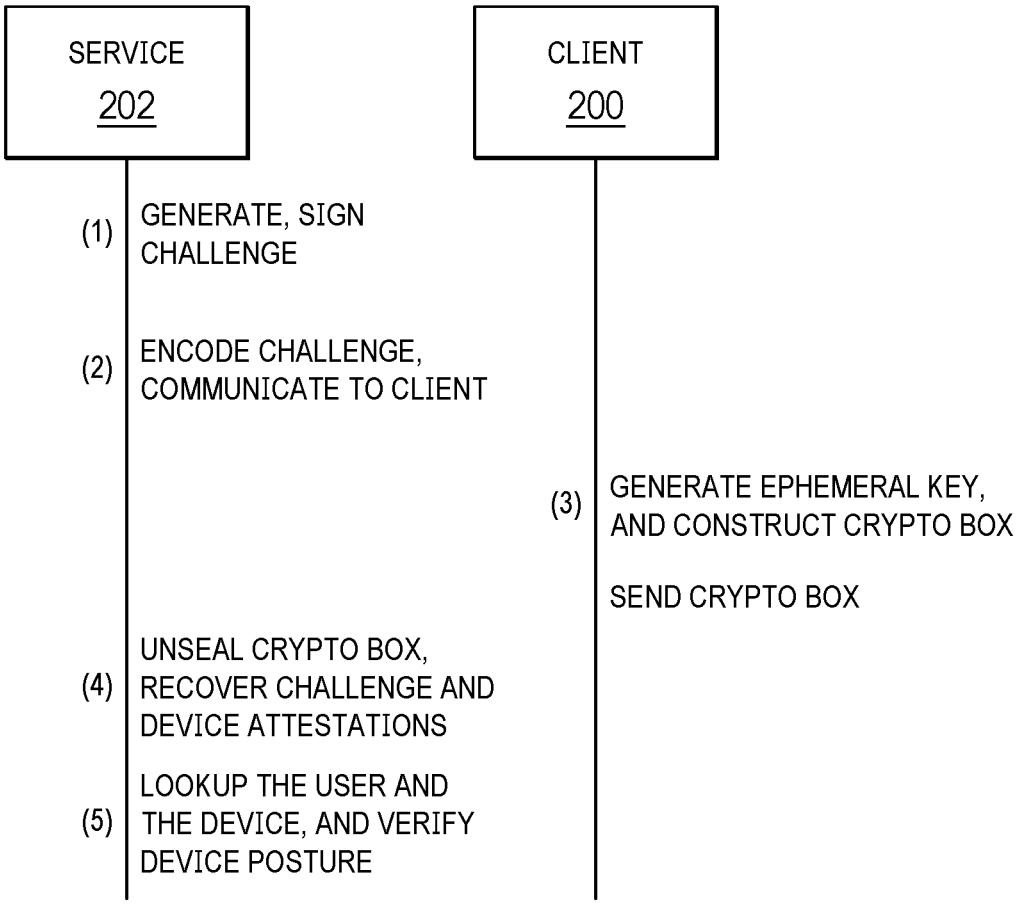
FIG. 2 depicts a representative public-key authenticated encryption scheme that protects communications between the ZTA service and a client.

The technique of this disclosure provides for a zero trust architecture (ZTA) that enables an end user to access protected sites using a conventional multi-factor authentication (MFA) scheme. The ZTA preferably is implemented in a SaaS-based manner, typically leveraging a cloud computing infrastructure. As used herein, the term "site" typically refers to a website (or some protected portion thereof), but the reference to a "site" should be broadly construed to refer to any protected resource available from a server or other computing entity. The resource may be the overall site, a portion of the site, a page, an application that opens up a webpage to do a token-based authentication, a document or other file, or a single object. The end user has an associated mobile device running one or more mobile applications (or "apps") including the agent app of this disclosure, as will be described below. The mobile device may be a smartphone, tablet or wearable, an IoT device or appliance, or the like. The mobile app can be downloaded and installed via a mobile application delivery service, or it may be provided as a native application on the mobile device.

FIG. 1 depicts representative components of a zero trust architecture 100 of this disclosure. The architecture 100 comprises a service 102 (a web application), typically implemented as a set of configurable computing resources (e.g. networks, network bandwidth, servers, processing, memory, storage, applications, virtual machines, and services), a mobile application 104 that executes on an end user mobile device 105, an agent 106, and an Identity Provider (IdP) 108. Typically, the service 102 is multi-tenant based, and it is provided on behalf of a service customer (an organization) that desires to enables its end users to obtain secure access to the organization's protected resources 114 (e.g., a SaaS application) hosted on one or more servers 112. As will be described, the service 102 typically is implemented as an adjunct to the organization's existing authentication process flow. In a variant embodiment, the service 102 may be directly integrated with the organization's authentication process flow. As also depicted, agent 106 is provided by the service 102 and is configured to execute in the device 105 at a network interface, preferably the local loopback interface 107. To obtain the agent, the user of the mobile device registers that device with the service 102. The particular manner by which the agent is registered to the service may vary and is not a limitation.

As depicted, the mobile device 105 typically includes a browser 103, which is shown to the right. Typically, the browser is a web browser that includes native support for rendering web pages and interpreting scripts, such as the script 110 that is provided by the service 102 during an authentication flow (as will be described in more detail below). The mobile application 104 facilitates device registration and subsequent identification of the mobile device 105 during the authentication (e.g., typically MFA) process. The mobile application 104 (through the agent 106) also sends device posture telemetry to the service 102, typically whenever the mobile application is launched and continuously during operation of the device. As will be described in more detail below, the agent 106 that executes at the local loop interface together with the script 110 that executes in the browser 103 provides the client-code necessary to enable the service to confirm that the device 105 is recognized by the service (typically by virtue of its prior registration). As will be described, the agent operates as a web server daemon. Additionally, and as noted, the agent 106 is responsible for generating the relevant device posture telemetry that the mobile application 104 sends to the service 102.

Because the device trust authentication flow preferably acts as a single possession factor, it is designed to be integrated within an existing centralized provider solution (e.g., Okta™, Duo™) or the like. To this end, the IdP 108 acts as a Security Assertion Markup Language (SAML) v2.0 protocol-compliant IdP, and it enables the service 102 to obtain a list of persons in-scope for device trust and, if necessary, to re-verify their identity with their associated IdP. SAML is an XML-based standard for exchanging authentication and authorization data between security domains, such as between an identity provider and a service provider. SAML assumes that a principal (often a user) has enrolled with at least one identity provider, which provides local authentication services to the principal. A service provider relies on the identity provider to identify the principal. At the principal's request, the identity provider passes a SAML assertion (a token) to the service provider. On the basis of this assertion, the service provider (SP) makes an access control decision. The IdP 108 may be implemented natively in the service 102 in lieu of using a third party provider.

Preferably, communications between the service 102 and a client running the mobile application 104 and agent 106 are protected by public-key authenticated encryption to encrypt and sign messages. In this approach, securely-generated nonces are used to achieve privacy and ensure against third party forgeability. In a representative embodiment, the public-key authenticated encryption is implemented via NaCl (e.g., crypto_box). As part of the public-key based authentication scheme, bootstrapping trust is necessary. To this end, when a client (any mobile device 105 running the mobile application 104 and agent 106) successfully registers, the service 102 associates it with an existing identity (obtained via its IdP 108 integration), stores the device's public key securely, e.g., in a long-term storage, and considers the device's identity trusted for the purposes of future authentication attempts. By default, and in one non-limiting embodiment, the service 102 implicitly trusts the first device registered by a user who authenticates successfully via the organization's SSO provider. This method of bootstrapping is also known as the Trust On First Use (TOFU). Subsequent devices must then be either manually approved by an organization-appointed service administrator, or, the user must successfully authenticate with a previously trusted device to extend that trust to a new device he or she desires to register.

The high-level construction and verification of messages preferably conforms to an authentication protocol as depicted in FIG. 2. In response to an authentication request, and at step (1), the service 202 generates and signs a challenge. The challenge will eventually be sent back to the service 202 from the client 200. As such, the challenge preferably has a set of properties, namely, the service can read the challenge and convert it a known user's identity, the service can verify the authenticity of the challenge's content, and the service considers the challenge invalid after a short time period has elapsed from initial generation. At step (2), the service 102 encodes the challenge into a data structure and communicates it to the client. At step (3), the client generates an ephemeral key and locates the public key material necessary to construct a NaCl crypto box for the service. The box is filled with the original challenge sent by the service and one or more device attestations. The box is signed by the client's long-term public key, which was previously sent to the service during device registration. At step (4), the service receives the box ciphertext, unseals the crypto box using its own keys, and obtains the original challenge and the new device identification attestations. At step (5), the service uses this information to lookup the user and the device, and proceeds to verify the device's posture.

Figure 3A:
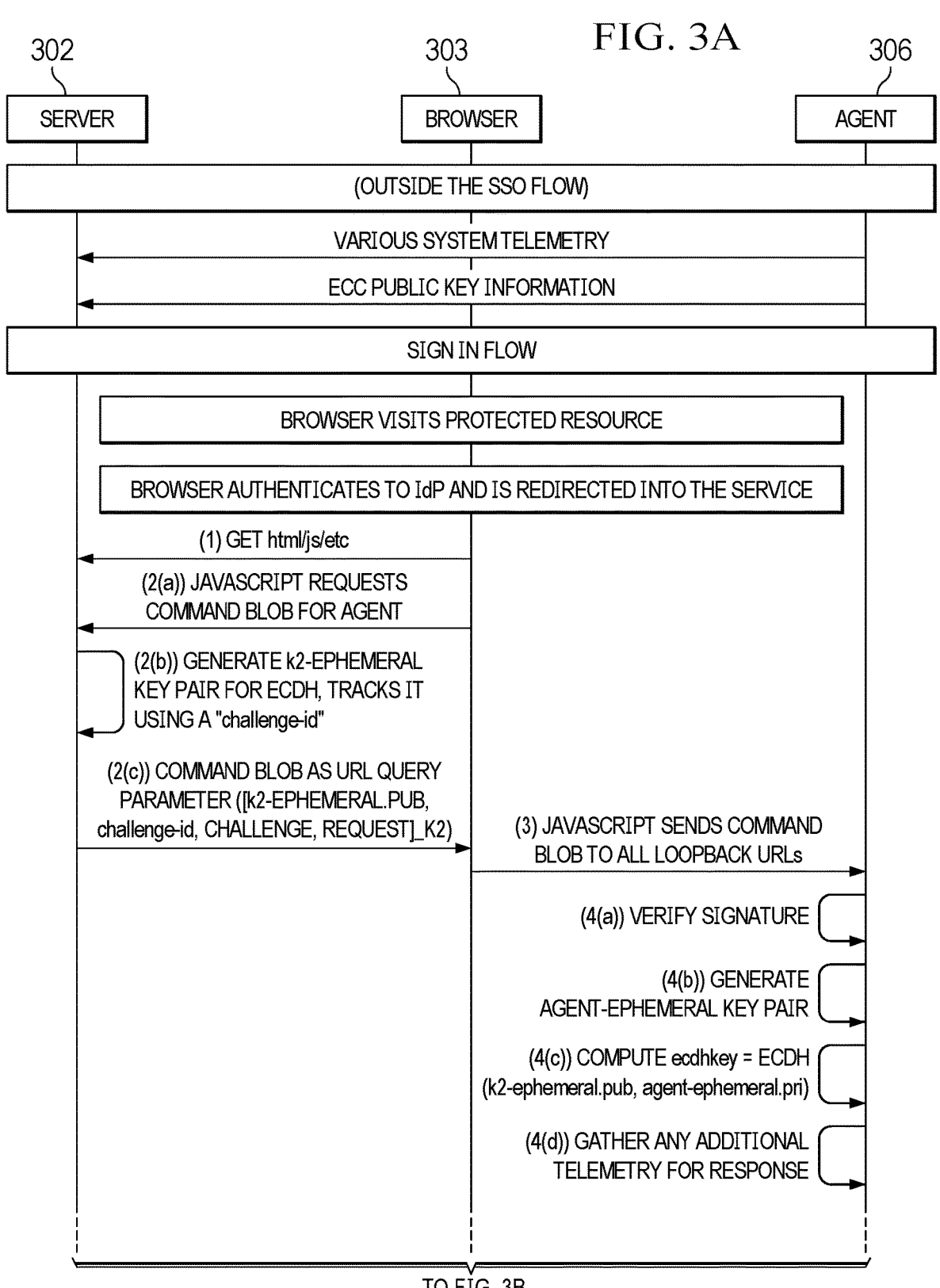

FIGS. 3A-3B together depict a more detailed implementation according to a preferred embodiment. In this scenario, the service (or server) 302 is shown on the left. The client (e.g., mobile device) comprises browser 303 and agent 306. As noted above, typically the agent runs in association with the mobile application. The client is assumed to have registered with the service previously. Outside of the SSO flow, and as depicted, the agent provides (synchronously or asynchronously) the service with device posture telemetry. Additionally, the agent 306 provides public key information to the service to facilitate the public-key authentication encryption scheme as described generally in FIG. 2. In this example, the encryption implements an Elliptic Curve Cryptographic (ECC) scheme, such as Elliptic Curve-Diffie Hellman (ECDH). This scheme is not intended to be limiting, as other cryptographic algorithms (e.g., RSA) may be used. A sign-in flow then proceeds as follows, with the browser 303 visiting a protected resource.

In particular, after the browser authenticates to the IdP and is redirected into the ZTA, preferably the following operations are then carried out. At step (1), the browser makes a request (e.g., an HTTP GET/) to the service and receives a script (a .js file) in response. Upon receipt of the script from the service, the script is executed automatically by the browser 303. This execution controls the browser 303 at step (2(a)) to request (from the service) of a control blob for the agent 306. The service responds at step (2(b)) to generate an ephemeral key pair for ECDH (referred to as "k2-ephemeral key pair"), and it associates that key pair with a "challenge-id". The key pair has an public ephemeral key ("k2-ephemeral.pub"), and an associated private ephemeral key ("k2-ephemeral.pri"). At step (2(c)), and in response to the previous request, the service returns to the browser a cryptographic challenge, for example, a command blob {[k2-ephemeral.pub, challenge-id, challenge, request] _k2}. At step (3), the browser 303 receives the challenge and sends the command blob to all loopback URLs. As noted above, the agent 306 preferably executes via a local loopback interface. As such, it receives the command blob. At step (4(a)), the agent verifies a signature (over the blob). In response to this verification, the agent generates its own agent-ephemeral key pair (agent-ephemeral.pub and agent-ephemeral.pri) at step (4(b)) and, at step (4(c)), computes an ECDH key (ecdhkey) as ECDH (k2-ephemeral.pub, agent-ephemeral.pri). At step (4(d)), the agent 303 gathers any additional telemetry that may be needed or desired for the response to the challenge.

Figure 6:
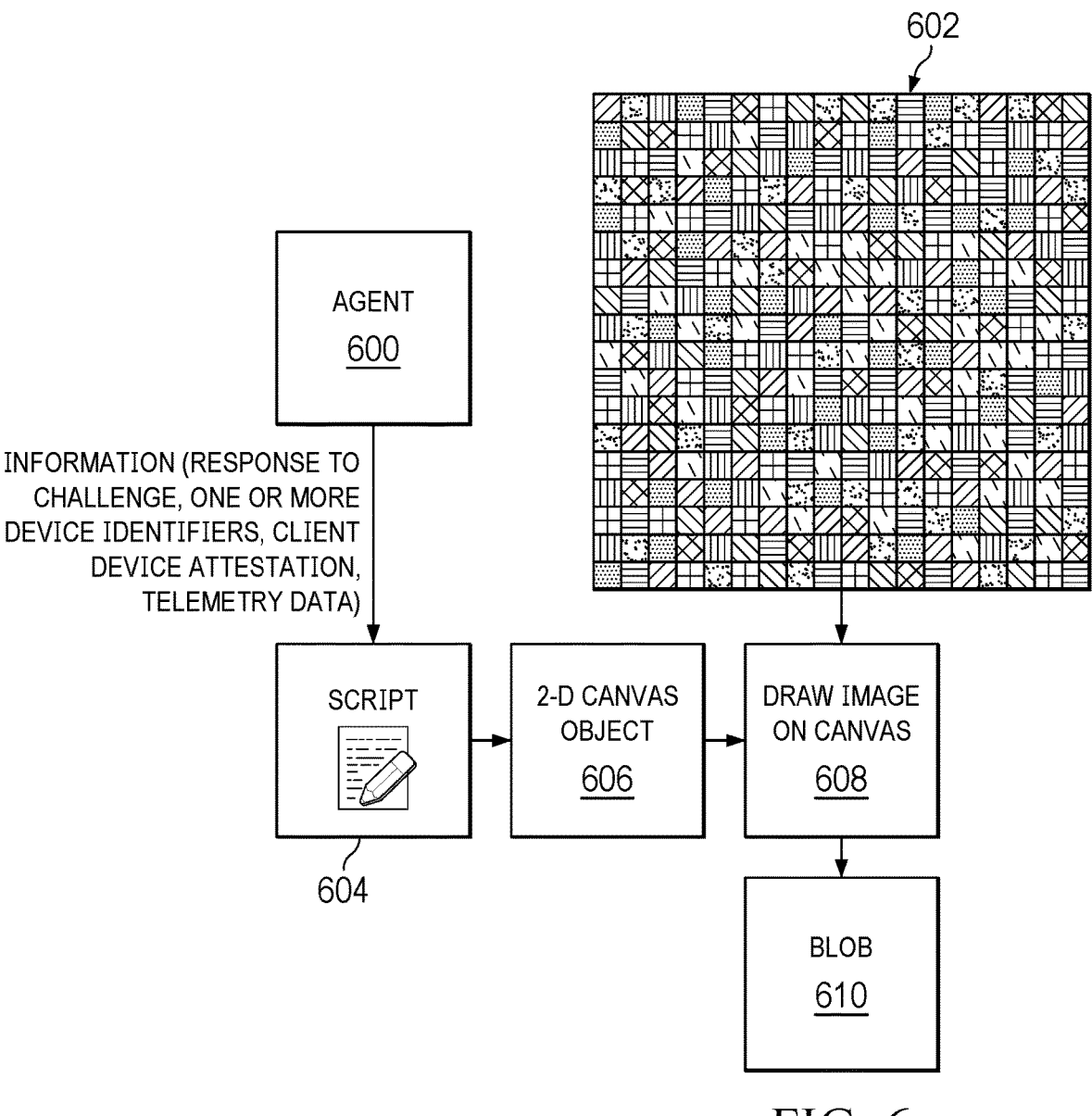
FIG. 6 depicts how the agent encodes collected device data and passes that data through the browser by painting an image onto a special canvas object.

Then, at step (5(a)) the agent encodes a response blob into a Portable Networks Graphic (.png) file using ([{challenge, response, agent_pub} _ecdhkey, challenge-id, agent-ephemeral.pub] _agent). At step (5(b)), the agent 303 replies to the script (i.e., the cryptographic challenge) by providing the .png file to the browser. The use of a .png file is highly advantageous because this file format uses a lossless compression, meaning that there is no loss in quality each time the file is opened and saved. The .png file is an image, such as depicted in FIG. 6. The image comprises color blocks that encode information, such as information collected by the agent in response to the cryptographic challenge. This information may include the response to the challenge, one or more device identifiers, and a client device attestation. The image may also include the device telemetry collected by the agent.

At step (6(a)), the script draws the .png onto a canvas Application Programming Interface (API) and, at step (6(b)), the script extracts the response blob from the .png. In this manner, the script acts as a proxy, taking whatever data is in the image, and turning it into the blob. At step (7), the browser sends the response blob back to the service. At step (8(a)), the server uses the challenge_id received from the client to find the server private key, k2-ephemeral.pri. At step (8(b)), the server computes ecdhkey=ECDH (k2-ephemeral.pri, agent-ephemeral.pub) and, at step (8(c)), uses it to unseal the crypto box. At step (8(d)), the server verifies a signature (over the response) using agent .pub from the crypto box. Then, at step (8(e)), the server verifies the challenge response received from the client.

If the challenge response is verified, the server then continues at step (9), using the provided cryptographic signatures to find the stored information for the device. In effect, these operations confirm that the device is known to the service (by virtue of its prior registration), and that the user seeking to authenticate is associated with that device.

At step (10), the server uses the telemetry (which is typically received by the server out-of-band (OOB) of the sign-in flow) to determine the device state. If, and based on the determined device state, the server determines that device is compliant with the organization's security policies or requirements, the sign-in flow is complete and the end user is afforded access to the protected resource. On the other hand, it may be the case that the device posture telemetry indicates that the end user's device is not presently in compliance with one or more of the organization's security policies or requirements. In such case, and before the sign-in completes, preferably a "remediation" phase is carried out, as is now described.

Figure 4:
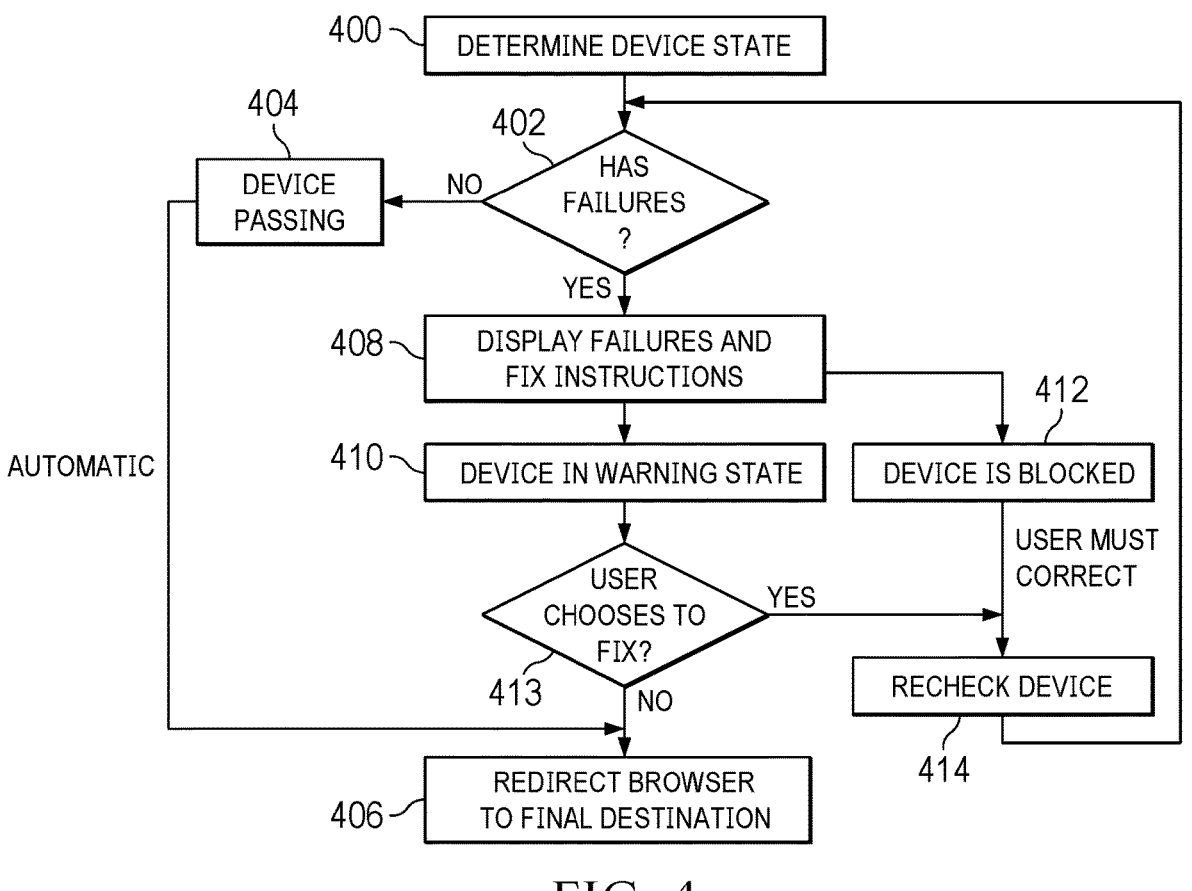
FIG. 4 is a device remediation flow according to another aspect of this disclosure.

FIG. 4 depicts a preferred remediation phase process flow, which begins at step 400, and which corresponds to step (10) in the FIGS. 3A-3B process flow. At step 402, the server tests whether the device state has any failures. As used herein, a failure indicates that some aspect of the organization's security policy or other compliance requirement is not met. A failure may be caused by any number of acts or omissions, e.g., a failure to apply a given security patch, a failure to update an application, an indication that the end user is keeping files with sensitive data on the device, a failure of the end user to keep his or her security or other information current, or the like. Step 402 thus executes a set of "checks" that query (typically from the telemetry data) whether the organization's security compliance requirements are met. The number and nature of the compliance requirements (and thus the checks) may vary. Depending on the nature of the compliance requirement, a failure to meet the requirement may provide cause to simply warn the end user of the problem, or the problem may be so severe as to justify blocking the device from completing its sign-in flow unless and until the failure is rectified.

If the outcome of the test at step 402 is negative, the device is indicated as passing at step 404, and the sign-in flow is completed automatically by redirecting the client browser to the protected resource at step 406. If, however, the outcome of the test 402 indicates one or more failing checks, the process continues at step 408 to display to the end user an indication of the identified failures; optionally, and depending on the nature of the fix, step 408 may also display to the user a set of fix instructions. As noted above, and depending on the severity of the failure, the device may be in a warning state 410 (where it needs to be fixed but not necessarily presently), or it may be in a blocked state 412 (where it must be fixed in order to proceed with the sign-in). When the device is in the warning state 410, the service provides the user with an opportunity to address the failure (or to bypass the issue, possibly to perform a fix later). Step 411 tests whether the user has elected to attempt the fix. If the end user declines the present opportunity (as indicated by a negative outcome at step 411), the flow passes to step 406 and the sign-in flow preferably still completes as previously described. If, however, when the device is in the warning state and the end user elects to fix the identified failure (as indicated by a positive outcome at step 411), the control moves to step 414. At this step, and assuming that the end user has followed the fix instructions or otherwise rectified the noted failure, the end user may then elect to have the device re-checked. If the end user elects to have the device re-checked, control then returns back to step 400. Step 414 is also reached when the device is in the blocked state 412 but only after the user has corrected the issue (that has caused the device to be in the blocked state). If there are multiple failing checks, the re-check operation is delayed until each such failing check is corrected (or, if only a warning, bypassed). When the re-check function is selected, preferably it is based on new telemetry collected by the agent and delivered to the server. This follow-on data collection and delivery may be done out-of-band from the browser script workflow described above with respect to FIGS. 3A-3B. After the re-check is carried out, the sign-in flow (as previously described) is then afforded another opportunity to complete so that access to the protected resource may be obtained (assuming the re-check succeeds).

Figure 5:
FIG. 5 depicts a representative device display during the device remediation flow.

FIG. 5 depicts a representative browser display panel 500 provided to the end user during the user's attempted sign-in. In this example, there are two failing checks ("Device has not been re-booted recently" and "Automatic updates improperly configured"), and the display also includes a Details link 502 (for each failure) at which fix instructions may be reviewed by the end user. In this particular example, the failing checks are not sufficient to have placed the device in a blocked state; thus, display button 504 ("Fix the blocking issues to sign-in") is greyed out. If one or both of the failures were severe enough, however, a display button 504 would be activated and available for selection. The end user would then have to select the display button 504 and complete the remediation required to address the failure(s). In this latter use case, the user would then select the "Recheck" button 506 to initiate the recheck process (step 414 in FIG. 4).

As noted above, when the device is only in the warning state (display button 504 will be inactive), the user also can initiate the recheck process (by clicking button 506). As also depicted in FIG. 5, the display panel 500 may also provide a notification 508 about an impending failure (e.g., "Unencrypted SSH key detected") that may cause the device to be placed either in a warning or blocked state at a given time in the future (e.g., "Tomorrow"). This function enables the end user to attempt to pre-empt the security/compliance issue by taking corrective action before that time. While the above-described display workflow preferably is browser-based, this is not a requirement, as the information in the display panel (or the communication itself) may be provided to the end user via other channels or methods. Thus, for example, a failure may be indicated aurally or by providing a tactile indication, the re-check may be initiated by voice command, and so forth.

The remediation phase workflow provides significant advantages. It provides for a highly-effective way to use end-users themselves as a conduit to solve nuanced and advanced security problems on any computing devices that are designed to be used regularly by human beings in an organization setting. In this security model, and as has been described, users are visually warned about security compliance failure(s) at a specific point of performance (in this case, during the sign in process). The warning screen is designed to elicit specific behaviors (get the user to solve the defined problem); in certain circumstances (e.g., when the device is in the blocked state), and if that behavior is not achieved, a consequence is employed (blocking access to an application that the user may otherwise need to do his or her job) to generate the response. Thus, and in the preferred remediation technique, the approach thus provides the display screen that shows a user one or more issues on his or her device that are currently blocking the device or will block the device soon, the ability for the end-user to by-pass the issue (if it is a failure that just puts the device in the warning state) or perhaps otherwise request an exception when necessary, the ability for the end-user to obtain/view step-by-step remediation instructions for each issue presented to them, and the ability for the end-user to unblock their device by re-checking the device right from the web browser (with real-time feedback). The re-checking feature of the end-user remediation flow provides significant advantages, as this feedback loop allows users to understand the transactional nature of the system ("if I fix X, I'll be allowed to access Y").

As described above in FIGS. 3A-3B, the device trust solution herein provides the service the ability to identify the identity of a device during the sign-in flow initiated from within the client browser. For certain browsers, it is quite difficult to identify the precise device that is being used to sign into an SSO-protected application. For example, the Apple® Safari® web browser does not permit Asynchronous JavaScript and Extensible Markup Language (XML) (AJAX) requests to an internal loopback address at which the agent executes. The use of the image encoding scheme as elaborated on below provides a way for the local device agent to communicate with the service in the cloud and, in particular, using the web browser as a communication conduit. Once the information passed back to the server is received and analyzed (see, FIGS. 3A-3B), the allows the service to know for certain which of the devices associated with the end user is being used to sign-in currently (and thus to verify that the service has seen the device previously). As has been described, this is achieved by the web application during the user authentication flows.

As noted above, web application (the service) facilitates the zero trust authentication using a cryptographic challenge. In one embodiment, (see, FIGS. 3A-3B, step (2(a)) the cryptographic challenge is implemented in an HTML image tag returned to the browser. At a high-level, the image tag may of the following form (not intending to be limiting):

```
<img src=" . . . //loopback address: port/v0/box="
    base64encodedcryptochallenge" onload="verify
    device( )"">
```

The agent 600 responds to this tag with the image 602, such as depicted in FIG. 6. When the image finishes loading, the script 604 creates a blank 2-D canvas object 606 with the same dimensions as the image, draws the image onto the canvas (at 608), and converts the canvas into a base64 blob 610, which can be read programmatically, e.g., as a JSON object that the script returns to the server in an AJAX request-response flow. Preferably, the image format is chosen to allow for lossless conversion of the image to the canvas; thus, preferably the image is in a .png file format, although this is not a limitation as other image low loss image formats may be used. The image includes colors and blocks that encode the information and enable the browser to pass that information back to the server. Using colors and larger blocks allow for the information to be read reliably after the image is converted to canvas. As previously described, the blob is sent to the server, e.g., using an AJAX response flow, where it is decoded and read by a parser, which identifies the information encoded therein, namely, the challenge, the response to the challenge, the one or more device identifiers, the client device attestation, and the telemetry information. This encoding/canvas technique works across all browsers and together with the script (which acts as a proxy, thereby obviating decryption of collected data), this mechanism uses the browser to pass the information to the service. In this manner, the approach herein provides for browser-supported security posture device collection and verification that is reliable, secure, and seamless to the end user and the other client processes.

Thus, and according to the above-described process flow, the principles of zero trust are employed to block a device from accessing an organization's SaaS applications or other resources if it is not running the agent or other passing specific requirements as set forth in the challenge. The approach leverages a client-side data collection agent, together with a unique encoding scheme and the use of the client's browser to pass the collection information to the back-end server that evaluates the collected data to determine the device's security compliance state. A further aspect of this disclosure provides for the notion of end-user self-remediation. In particular, during the device sign-in flow, the service uses the device posture telemetry to determine the device state. Depending on the organization's security requirements or policies, it may be the case that the device posture check indicates that the device is not presently in compliance with those requirements or policies. In such case, the end-user self-remediation workflow is instantiated to provide the end user with information about any device failures, the ability to address those failures, as well as the ability to enable the end-user to initial a device re-checking function.

The above-described sign-in flow provides a device trust workflow with significant advantages. In this approach, the end-user (let alone an attacker) cannot easily access the secret key material or even the outputs needed to successfully solve the cryptographic challenge presented by the service. Because relying on phishing is ineffective, attackers looking to bypass the authentication must take actions that allow them to compromise the underlying system. Unlike pure phishing techniques, however, such actions are much more likely to be detected (and thus remediated) by an organization's security systems and teams.

The agent executing on the client may be configured to perform any number of device and security checks. The particular nature and scope of these checks is not a limitation of this disclosure.

Enabling Technologies

A mobile device comprises a CPU (central processing unit), computer memory, such as RAM, and a drive. The device software includes an operating system (e.g., Apple iOS, Google Android™, or the like), and generic support applications and utilities. The device may also include a graphics processing unit (GPU). It also includes a touch-sensing device or interface configured to receive input from a user's touch and to send this information to processor. The touch-sensing device typically is a touch screen. The device typically also comprises a high-resolution camera for capturing images (e.g., QR codes), an accelerometer, a gyroscope, and the like.

The cloud service is a technology platform that may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the cloud service comprises a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

The computing entity on which the browser and its associated browser plug-in run may be any network-accessible computing entity that is other than the mobile device that runs the authenticator app itself. Representative entities include laptops, desktops, workstations, other mobile devices or machines associated with such other mobile devices, and the like.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Any described commercial products, systems and services are provided for illustrative purposes only and are not intended to limit the scope of this disclosure.

The techniques herein provide for improvements to technology or technical field, namely, cloud-based access control, as well as improvements to various technologies such as secure authentication, and the like, all as described.

What is claimed is as follows:

1. A method operative at a server to facilitate access to a protected resource from a client device having a renderer, and code accessible via a loopback interface, comprising:

receiving device telemetry collected by the code;

determining, using the device telemetry, whether a security posture of the client device meets a given criteria;

during an authentication flow that seeks access to the protected resource:

provide the client device a script configured to execute in the renderer;

respond to a request received from the client device in response to execution of the script to generate and provide the client device a challenge;

receive a data set from the client device, the data set having been generated at the client device by execution of the script that delivered the challenge to the code via the loopback interface, received from the code an image encoding given information, extracted and transcoded the given information into the data set, and outputted the data set;

recover the given information by responding to receipt of the data set; and complete the authentication flow when the security posture of the client device meets the given criteria.

2. The method as described in claim 1 wherein the device telemetry is collected out-of-band with respect to the authentication flow.

3. The method as described in claim 1 wherein the image has a file format with lossless compression.

4. The method as described in claim 3 wherein the file format is Portable Networks Graphics.

5. The method as described in claim 1 wherein the script proxies the given information by creating a blank, two-dimensional (2D) object defining a canvas, drawing the image onto the canvas, reading the canvas, and transforming data read from the canvas into the set of data.

6. The method as described in claim 5 wherein the image comprises a set of colors encoding at least one of: the challenge, the response to the challenge, one or more device identifiers, a client device attestation, and client device state data.

7. The method as described in claim 1 wherein the authentication flow is a single sign-on.

8. The method as described in claim 1 wherein the challenge is a cryptographic challenge.

9. The method as described in claim 1 wherein the server is associated with a cloud-accessible service.

* * * * *